(12) United States Patent
Ruvolo et al.

(10) Patent No.: US 7,970,712 B2
(45) Date of Patent: Jun. 28, 2011

(54) DISPLAYING STRENGTHS OF SOCIAL RELATIONSHIPS BETWEEN A USER AND OTHER PEOPLE

(75) Inventors: Joann Ruvolo, San Jose, CA (US); Andrew L. Schirmer, Andover, MA (US); Marijane M. Zeller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 2297 days.

(21) Appl. No.: 10/323,567

(22) Filed: Dec. 19, 2002

(65) Prior Publication Data

US 2004/0122681 A1 Jun. 24, 2004

(51) Int. Cl.
G06Q 10/00 (2006.01)
(52) U.S. Cl. .......................... 705/319; 705/1.1
(58) Field of Classification Search .................. 705/1
See application file for complete search history.

(56) References Cited

U.S. PATENT DOCUMENTS

| | | | |
|---|---|---|---|
| 5,963,951 A | 10/1999 | Collins | |
| 6,052,122 A | 4/2000 | Sutcliffe et al. | |
| 6,061,681 A | 5/2000 | Collins | |
| 6,175,831 B1 | 1/2001 | Weinreich et al. | |
| 6,269,369 B1 * | 7/2001 | Robertson | 707/10 |
| 6,735,568 B1 | 5/2004 | Buckwalter et al. | |
| 2003/0050977 A1 * | 3/2003 | Puthenkulam et al. | 709/204 |
| 2003/0220980 A1 | 11/2003 | Crane | |

OTHER PUBLICATIONS

Groebner, David F. and PatrickW. Shannon. Business Statistics: A Decision-Making Approach. Charles E. Merrill Publishing Co., Columbus, Ohio. 1981, p. 516-521.*

Wayback Machine; eHarmony.com; http://web.archive.org/web/20011003190740/www.eHarmony.com; p. 1.
Wayback Machine; eHarmony.com; http://web.archive.org/web/20020802011830/www.eHarmony.com; p. 1.

(Continued)

Primary Examiner — Jamisue A Plucinski
Assistant Examiner — Gabrielle McCormick
(74) Attorney, Agent, or Firm — Gibb I.P. Law Firm, LLC; Ray Szeto, Esq.

(57) ABSTRACT

The invention provides method of displaying strengths of social relationships between users of a computerized network. The invention evaluates network information, such as network communications, between one user of the network and other users of the network to produce metrics. The invention then normalizes the metrics from the perspective of the viewing user to produce relationship values representing strengths of social relationships between the viewing user and the other users. The invention classifies the relationship values into different groups, and optionally assigns context commands to each of the groups. The invention places each of the other users in one of the groups (according to their relationship value) and then displays a listing of the other users and their associated group identifications. The invention can assign different indicators to each of the groups, wherein the display links corresponding indicators to each of the other users to graphically identify the group in which each of the other users was placed. The display can utilize numbers, characters, sizes, fonts, character sets, icons, graphic features, colors, motions, speeds, and/or directions to graphically distinguish and identify the group in which each of the other users was placed. The displaying is primarily directed to and for use by the viewing user, but other users can use the invention to study relationships of a particular individual.

31 Claims, 2 Drawing Sheets

OTHER PUBLICATIONS

"Designing and Using Human-Computer Interfaces and Knowledge Based Systems", Gavriel Salvendy and Michael J. Smith, Advances in Human Factors/Ergonomics, 12B, Proceedings of the Third International Conference on Human-Computer Interaction, Boston, Massachusetts, Sep. 18-22, 1989, vol. II, pp. 845-852.

"Memoirs: A Personal Multimedia Information System", M.W. Landsdale, D.R. Young and C.A. Bass, Cognitive Ergonomics Research Group, Department of Human Sciences, Loughborough University of Technology, Loughborough, Leicestershire LE11 3TU, U.K., Sep. 18-22, 1989, pp. 317-327.

"Cooperative Information Agents III", Matthias Klusch, Onn M. Shehory and Gerhard Weiss, Third International Workshop, CIA '99, Uppsala, Sweden, Jul. 31-Aug. 2, 1999 Proceedings, pp. 1651-1652.

"An Agent-Based System for Intelligent Collaborative Filtering", Colm O'Riordan and Humphrey Sorensen, Cooperative Information Agents III, International Workshop, 3rd, Uppsala, Jul. 31-Aug. 2, 1999, CIA '99 Proceedings (Lecture Notes in Artificial Intelligence, vol. 1652) pp. 125-135.

"Introduction to Algorithms", Thomas H. Cormen, Charles E. Leiserson, and Ronald L. Rivest, The MIT Press, Cambridge, Massachusetts, 25.2 Dijkstra's Algorithm, 1989, pp. 525-531.

* cited by examiner

DISPLAYING STRENGTHS OF SOCIAL RELATIONSHIPS BETWEEN A USER AND OTHER PEOPLE

BACKGROUND OF THE INVENTION

1. Field of the Invention

The present invention generally relates to displaying strengths of social relationships between users of a computerized network and more particularly to a method that normalizes network metrics from the perspective of the viewing user to produce relationship values representing strengths of social relationships between the viewing user and the other users.

2. Description of the Related Art

In the course of daily work, people make frequent connections to other people for many purposes, such as to gain information, advice, approval, make connections to other people, and so forth. Various systems exist that display and search for people and their information. Given that the most efficient social connections are those with people you know, there is an advantage in being able to distinguish people you know from people you do not know or to distinguish people with whom you have a strong relationship from those with which you have a weak relationship. Existing systems do not take advantage of these distinctions. The invention provides a mechanism for taking relationship information and making it available to the user as a personalized view of people in a system, and displays such information it in a straightforward and easy to understand way.

SUMMARY OF THE INVENTION

The invention provides method of displaying strengths of social relationships between users of a computerized network. The invention evaluates network information, such as network communications, between one user (e.g., "first" user, primary user, viewing user, etc.) of the network and other users of the network to produce metrics. The invention then normalizes the metrics from the perspective of the viewing user to produce relationship values representing strengths of social relationships between the viewing user and the other users.

In the normalizing process, the invention converts the metrics to be relative to all metrics associated with the viewing user to allow the relationship values to be perceived from the perspective of the viewing user and to be relative to the viewing user. In this process one relationship value is produced for each of the other users with respect to the viewing user.

The invention classifies the relationship values into different groups, and optionally assigns context commands to each of the groups. The invention places each of the other users in one of the groups (according to their relationship value) and then displays the other users and their associated group identifications. The invention can assign different indicators to each of the groups, wherein the display links corresponding indicators to each of the other users to graphically identify the group in which each of the other users was placed. The display can utilizes numbers, characters, sizes, fonts, character sets, icons, graphic features, colors, motions, speeds, and/or directions to graphically distinguish and identify the group in which each of the other users was placed. The displaying is primarily directed to and for use by the viewing user, but other users can use the invention to study relationships of a particular individual.

When the invention evaluates the network information, it automatically (e.g., without user intervention) evaluates address book information, calendar information, event information, to-do list information, a journal information, and/or e-mail information contained within the network to produce the metrics. In addition, the "other users" need not be all users of the network, and instead the other users can comprise a subset of all users of the network.

The invention is advantageous because it provides an intuitive and easy to use display of different classifications of relationships that the viewing user has with other users in the network. This allows the viewing user to quickly and easily make decisions regarding which user should be contacted, worked with, approached, etc. in a given situation. The invention is very useful because it allows the user to combine other qualitative knowledge, which may only be available to the viewing user, with the quantitative knowledge provided by the invention to make better decisions.

BRIEF DESCRIPTION OF THE DRAWINGS

The invention will be better understood from the following detailed description of preferred embodiments with reference to the drawings, in which.

DETAILED DESCRIPTION OF PREFERRED EMBODIMENTS OF THE INVENTION

Figure 1:
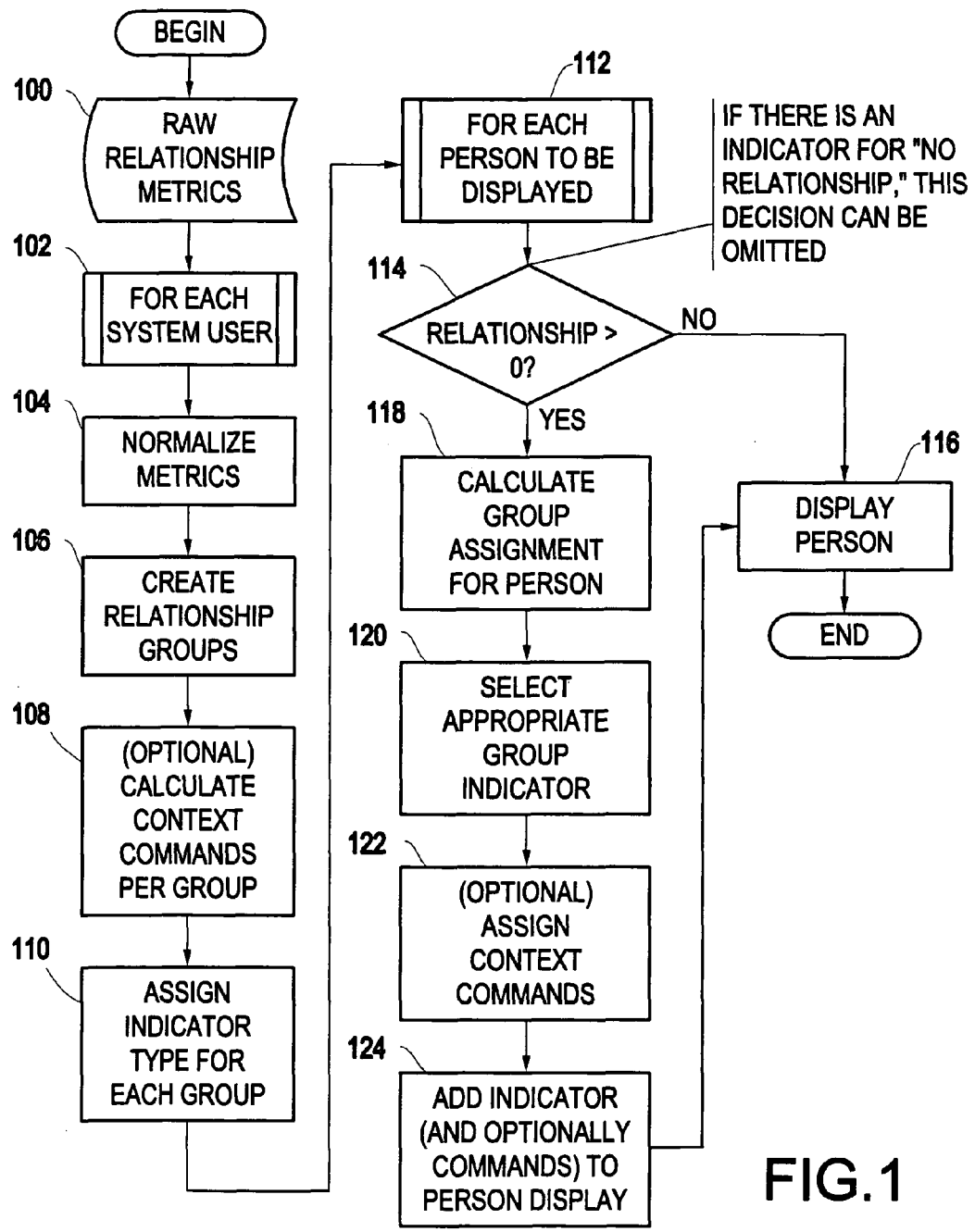
FIG. 1 is a flow diagram illustrating a preferred method of the invention.

Systems that display people generally do so in a generic fashion rather than in a way that makes personal sense to the system user. As described above, there is substantial benefit in having a view of people that is personal and augments a user's natural decision-making about whether to connect to a given person. Such additional information could be used in any number of different ways, including to communicate with other network users, learn about other network users, use other network users as a reference, and so forth.

A novel system of automatically calculating the relationship metrics between network users is disclosed in co-pending U.S. patent application Ser. No. 10/323,568 entitled "Detect and Qualify Relationships Between People and Find the Best Path Through the Resulting Social Network" hereinafter referred to as "co-pending application", that is being filed simultaneously herewith and that is fully incorporated herein by reference.

Briefly, the system disclosed in the co-pending application is a social network analysis of looking at how people interact. By being able to understand the interaction patterns between data stored in databases, it becomes possible to more quickly find who might be able to answer questions, understand the impact of organizational change initiatives, and find who serves as bridges between different parts of an organization.

Social networks and the analysis of them have been of interest for quite a while. The results of any analysis are dependent upon the social network data and the inferences drawn from that data. The co-pending application discloses a social network dynamically built and based on the interactions of individuals extracted from the records of their daily lives. These records primarily include data sources commonly found in and/or associated with Personal Information Management (PIM) systems, as well as phone logs, and proximity reports. These PIM data sources include a calendar, a to-do list, a journal, an address book, e-mail, etc. They are valuable sources of information because people use them to record their activities, tasks, and impressions, to organize their contacts, and to correspond. Interactions based on these activities and correspondence can be identified. Phone logs provide the phone number of the caller, and thus reveal possible interactions between the individuals associated with these phone numbers. For individuals who are tracked and choose to be tracked, the proximity records contain the encounters of those individuals detected to be within close proximity of each other.

These data sources of our daily life are primary sources of data. In addition to reflecting our current state, they provide history and even a glimpse into the future (e.g., scheduled meetings). They have been largely overlooked as a source of information.

The system of the co-pending application extracts the raw data from these daily-life sources to detect interactions among people (e.g., how often they meet, the last time they exchanged correspondence). It then makes inferences to detect as well as to qualify relationships between them. A relationship is qualified by assigning a value to it, based on the following attributes that the co-pending application defines for a relationship; longevity (how long have they been connected); currency (have they connected recently); frequency (how often do they connect); exclusivity (how exclusive is the connection (e.g., one-to-one vs. one-to-many, secure content); complexity (is the connection on many levels and on specific contexts); and reciprocity (is the connection mutual or just one-way).

The co-pending application describes a system that extracts data from several daily life sources to build a social network of its users based on their interactions with others. Some aspects of the co-pending application are providing a definition of a relationship (see attributes above), discovering that a relationship exists between two people, qualifying that relationship (i.e., defining its value) given the defined relationship attributes, dynamically building a social network based on these discovered relationships, and calculating the shortest and best paths through the social network given the quality of the relationships.

Additional aspects of the co-pending application are its use of primary data sources, that by the definition of their function (e.g., a calendar), provide a wealth of current and accurate information, without the added burden on its users to create artificial entries. The co-pending application can also qualify connections between people (e.g., this is a complex relationship), rather than just quantify them (e.g., a relationship exists because the parties have had n meetings).

Users that choose to use or are required to use a PIM system, by the nature of the entries, provide valuable information about themselves and those they interact with. Since PIMs are an integral part of many people's lives, the data in them is likely to be relevant, accurate, and current. This data provides a good basis for detecting relationships. One benefit of such a system is its ability to qualify the relationships between people by making inferences from the raw data. This knowledge of the strength of relationships mapped onto a relationship social network provides an effective communication path that benefits individuals, organizations, and even commerce. These features can be determined by discovering the individual's relationship attributes with the parties concerned. On an individual level, a person could use their social network to examine the characteristics of their own social network.

The present invention is concerned with how well two parties know each other and defines several relationship attributes in an attempt to qualify a relationship. The strength of a relationship is determined on the basis of several algorithms that calculate the precise values of these relationship attributes. Not only does the co-pending application detect a relationship, but also it rates the relationship based on relationship attributes.

As explained in the co-pending application, the system evaluates whether a user is a direct or indirect correspondence recipient as reflected by the address book information or the e-mail information. The system also evaluates times of events and users involved in events to establish relationships between the users. The system further evaluates the time of day of event or e-mails to establish whether a relationship is personal or business related. The disclosed system in the co-pending application can apply different weights the address book information, the calendar information, the event information, the to-do list information, the journal information, and the e-mail information to calculate the relationship ratings. When the invention identifies relationships between users of a computerized network, the invention extracts information from address books in the network and evaluates the information to produce relationship ratings of the users of the network.

It is also useful to take into account perspective, since the two parties involved in a relationship do not always have the same view of the relationship. Thus, it is proper to look at a relationship in absolute terms and in relative terms compared to all the other relationships of the user.

FIG. 1 illustrates one exemplary embodiment of the invention. The invention begins in item 100 with raw relationship metrics from sources such as address book information, calendar information, event information, to-do list information, journal information, e-mail information, etc. As indicated by item 102, the invention performs its processing from the perspective of one individual (the viewing user).

Therefore, in item 104, the invention normalizes the metrics from the viewpoint of the viewing user. Thus, the invention makes each of the metrics relative to what is normal for the viewing user. For example, if the viewing user would normally experience 20 e-mails per week (on average) from each of the other users in the network, interaction showing 5 e-mails per week with one of the other users would show relatively weak relationship. To the contrary, if the viewing user normally experienced 2 e-mails per week (on average) from each of the other users and the network, and interaction showing 5 e-mails per week from a specific user would show a relatively strong relationship with that user. All other metrics would similarly be normalized for the viewing user. Item 104 also represents that the invention produces relationship values that represent the strengths of the various relationships between the viewing user and the other users of the computerized network.

In item 106, the invention creates relationship groups based upon the range of relationships produced in item 104. In one example, the invention can be required to create a predetermined number of groups (e.g., 3). Such a system could group the ratings into groups such as "low relationship strengths" for the bottom one-third (statistically or numerically); "medium relationship strengths" for the middle one-third; and "high relationship strengths" for the upper one-third. Alternatively, the invention can dynamically establish the number of groups based upon the viewing user's input or upon algorithms that divide the relationship values according to predetermined standards. For example, in one method, the invention could look at the statistical distribution of the relationship values and form group barriers at each cluster in the statistical distribution that exceeded a predetermined percentage of the total number of relationship values. Similarly, the invention could split the range of values equally across a finite set of groups, say ⅓ of the values in each group. Another example could split the data into groups logarithmically. The invention can be tailored to meet different requirements for the meaning of the groupings, or to accommodate keeping the number of items in a group at a size appropriate to display or user comprehension. In addition, as would be understood by one ordinarily skilled in the art in light of this disclosure, many other methods and systems can be utilized to create the relationship groups in item 106.

In item 108, the invention can optionally calculate context commands for each of the groups created in item 106. For example, the invention provides a mechanism for binding contextual sets of commands that can vary between assigned relationship groups. This takes advantage of differences in social connections that could be used to further customize the interface. As an example, the system could make available for people with no relationship an "Introduce me" function that would not be necessary for other relationship groups.

In item 110, the invention assigns an indicator type for each of the groups created in item 106. These indicators will be displayed next to the name (or other identifying characteristic) of the other user on a display device to allow the viewing user to immediately know the strength of the relationship between the viewing user and the other user. The indicators can comprise any distinguishing characteristic (audio, visual, etc.), such as numbers, special characters, different character or number sizes or fonts, as well as different character sets, icons, graphic features, and colors. Further, the indicators can have different motions, speeds, and directions when viewed on the display and so as to more clearly distinguish the different strengths of the different relationships.

Thus, the particular methods of displaying relationship information can vary. The system could display relationship values as numbers, icons, special characters, colors, or in many other ways, depending upon the specific installation. The invention distinguishes the display of different people depending on the strength of their relationship to the system user so that the user derives the benefit of the distinction in an easy manner when making choices about whether to pursue a connection to the person.

The processing following item 112 is performed for each of the other users that will be displayed on the display device. At the viewing user's option (or according to other automated systems/methods) the number of other users that will be displayed on the display device can be restricted. Therefore, for example, a predetermined maximum (e.g., 20) may be utilized to restrict the number of users displayed. Alternatively, only those users that exceed a minimum relationship value (only the top 50% of relationship values) could be included on the display. Additionally, logical groups (departments, project groups, age groups, etc.) of users can also be selected to restrict the display. This may be important for large networks with thousands or hundreds of thousands of users, where displaying all users would be unworkable. Therefore, in item 112, the invention provides the user (or the system) with the option of picking specific users (or groups of users) so as to reduce the volume of users displayed. The processing which occurs in items 118-124 below occurs for each user that is to appear on the display.

In item 114, the invention determines whether there is some form of relationship between the viewing user and each of the other users that are to be displayed. Alternatively, the invention can include an indicator that appears on the display screen indicating that there is no relationship with a given user (in which case item 114 can be omitted). If there is no relationship, the other users name (or other identifying information) is simply displayed on the display device without any type of relationship ranking (or a showing of no relationship) as shown by the direct arrow from item 114 to item 116.

In item 118, the invention determines the group (of the groups defined in item 106) in which the other user belongs, based upon the other user's relationship value with the viewing user. In item 120, the indicator that has been associated with that group in item 110 is linked to the other user so that when the other user's name (or other identifying information) is displayed, the indicator will clearly and easily show the other user's ranking within the various relationship values. If context commands are calculated in item 108, they can be assigned in item 122. Item 124 shows the actual addition of the indicator to the display. As mentioned above, item 116 represents the actual displaying of the information as prepared above.

The following is but one example of a display that divides the relationships into three groups. The groups represent Strong, Moderate, and Slight relationships. This example is tailored to put the strongest 20% of relationships into the Strong group, 35% into the Moderate group, and the remaining values over 0 into the Slight group. In the display shown schematically below, a person with a Strong relationship is denoted with one indicator (three asterisks (*)), a person with a Moderate relationship is denoted with two asterisks (), a person with a Slight relationship is denoted with one asterisk (*), and a person with no relationship is denoted with no asterisks.

John Doe
Jane Smith**
Amos Harris
Susan Harvey*
Fred Dole
Doug March**

Figure 2:
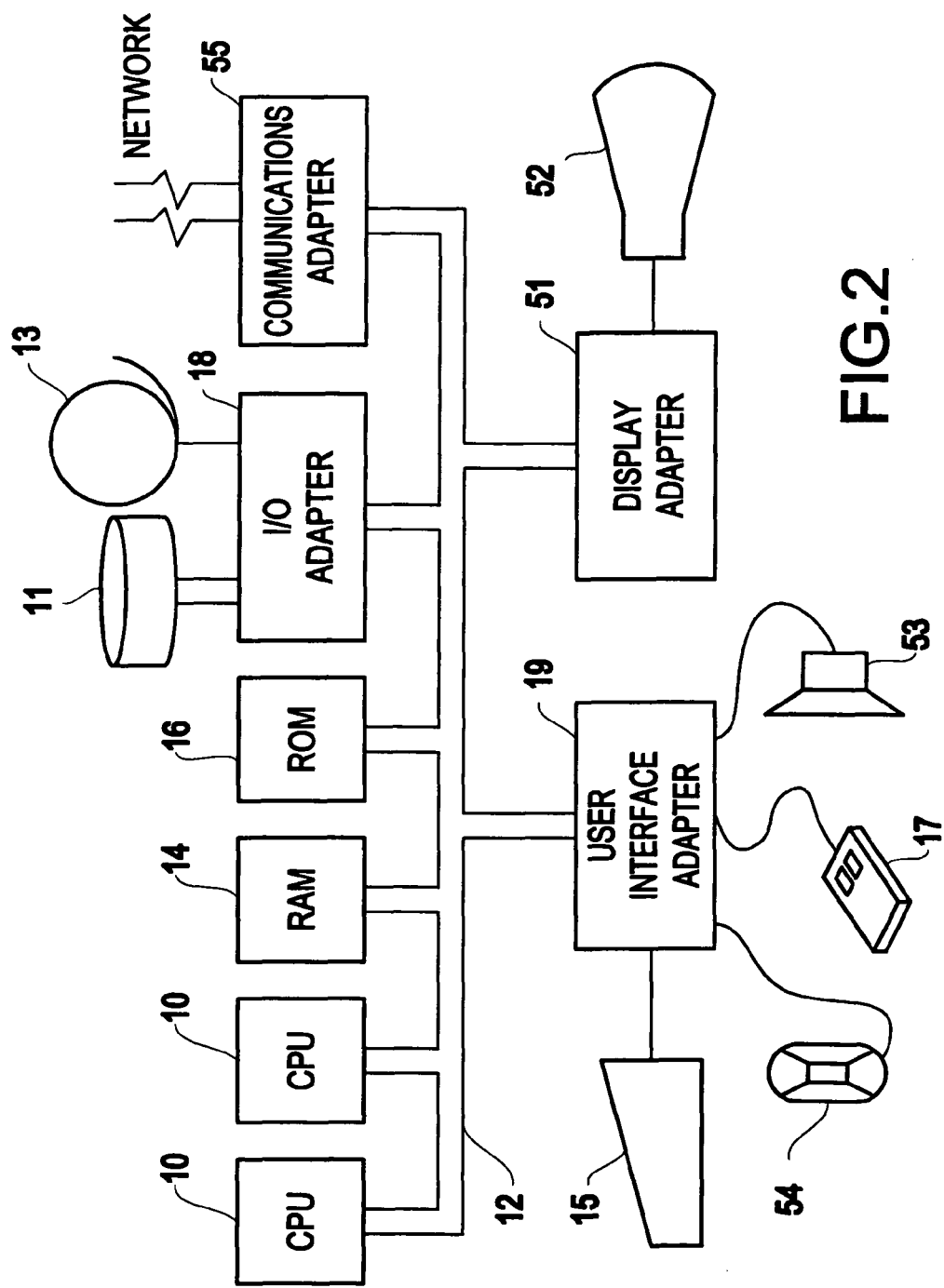
FIG. 2 is a hardware embodiment of the invention.

A representative hardware environment for practicing the present invention is depicted in FIG. 2, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, and an input/output (I/O) adapter 18 for connects peripheral devices, such as disk units 11 and tape drives 13, to bus 12, user interface adapter 19. The user interface connects keyboard 15, mouse 17, speaker 53, microphone 54, and/or other user interface devices such as touch screen device (not shown) to the bus 12. The communication adapter 55 connects the information handling system to a data processing network. The display adapter 51 connects the bus 12 to the display device 52. A program storage device readable by the disk or tape units is used to load the instructions which operate the invention also loaded onto the computer system. The display of people can be sorted or filtered based on the relationship strengths, making it even easier for the user to make connection judgments.

Therefore, as shown above, the invention is advantageous because it provides an intuitive and easy to use display of different classifications of relationships that the viewing user has with other users in the network. This allows the viewing user to quickly and easily make decisions regarding which user should be contacted, worked with, approached, etc. in a given situation. The invention is very useful because it allows the user to combine other qualitative knowledge, which may only be available to the viewing user, with the quantitative knowledge provided by the invention to make better decisions.

While the invention has been described in terms of preferred embodiments, those skilled in the art will recognize that the invention can be practiced with modification within the spirit and scope of the appended claims.

What is claimed is:

1. A method of displaying strengths of social relationships between users of a computerized network, said method comprising a computer performing the steps of:

evaluating network information and network communications between a first user of said network and other users of said network to produce relationship metrics between said first user and each of said other users, wherein each relationship metric comprises a measured value for interactions between said first user and one of said other users;

normalizing said relationship metrics from the perspective of said first user, wherein said normalizing converts each of said relationship metrics to be relative to all of said relationship metrics associated with said first user to produce relationship values representing relative strengths of social relationships between said first user and said other users, and wherein one relationship value is produced for each one of said other users with respect to said first user;

classifying said relationship values into different groups based on said relative strengths of said social relationships;

placing each of said other users in one of said different groups according to said relationship values;

assigning different indicators to each of said different groups such that each of said other users in each of said different groups is associated with a corresponding indicator; and displaying, for each of at least some of said other users, an identifier and said corresponding indicator, so as to graphically distinguish in which of said different groups each of said at least some of said other users was placed.

2. The method according to claim 1, wherein each relationship metric comprises a number of e-mails received by said first user from one of said other users.

3. The method according to claim 1, wherein said assigning of said different indicators comprises assigning one or more of sizes, fonts, icons, graphic features, colors, motions, speeds, and directions to graphically distinguish said different groups into which each of said other users was placed.

4. The method according to claim 1, wherein said evaluating comprises automatically, and without user intervention, evaluating one or more of calendar information, event information, to-do list information, journal information, and e-mail information to produce said relationship metrics.

5. The method according to claim 1, wherein said displaying further comprises limiting which of said other users are to be displayed based on at least one of a predetermined maximum number of said other users, a predetermined minimum relationship value for said other users, and additional logical groupings of said other users.

6. The method according to claim 1, wherein said other users comprise a subset of all users of said network.

7. A method of displaying relationships between users of a computerized network, said method comprising a computer performing the steps of:

normalizing, from the perspective of a first user of said network, relationship metrics between said first user and other users of said network, wherein each relationship metric comprises a measured value for interactions between said first user and one of said other users and wherein said normalizing converts each of said relationship metrics to be relative to all of said relationship metrics associated with said first user to produce relationship values representing relative strengths of social relationships between said first user and said other users, and wherein one relationship value is produced for each one of said other users with respect to said first user; and displaying identifiers for said other users, wherein said identifiers are displayed with corresponding indicators so as to graphically distinguish said other users based on said relationship values.

8. The method according to claim 7, further comprising assigning different indicators to different groups of said relationship values, wherein said displaying links a corresponding indicator to each of said other users.

9. The method according to claim 7, wherein said indicators comprise one or more of numbers, sizes, fonts, icons, graphic features, colors, motions, speeds, and directions.

10. The method according to claim 7, wherein said relationship metrics are determined based on an evaluation of one or more of calendar information, event information, to-do list information, journal information, and e-mail information to produce said metrics.

11. The method according to claim 7, wherein said displaying further comprises limiting which of said other users are to be displayed based on at least one of a predetermined maximum number of said other users, a predetermined minimum relationship value for said other users, and additional logical groupings of said other users.

12. The method according to claim 7, wherein said other users comprise a subset of all users of said network.

13. A method of displaying relationships between users of a computerized network, said method comprising a computer performing the steps of:

processing network information between a first user of said network and other users of said network to produce relationship metrics between said first user and each of said other users, wherein each relationship metric comprises a number of emails received by said first user from each of said other users;

normalizing said relationship metrics from the perspective of said first user, wherein said normalizing converts each of said relationship metrics to be relative to all of said relationship metrics associated with said first user to produce relationship values representing relative strengths of social relationships between said first user and said other users, and wherein one relationship value is produced for each one of said other users with respect to said first user; and displaying identifiers for said other users, wherein said identifiers are displayed with corresponding indicators so as to graphically distinguish said other users based on said relationship values.

14. The method according to claim 13, wherein each relationship metric comprises a number of e-mails received by said first user from one of said other users.

15. The method according to claim 13, further comprising assigning different indicators to different groups of said relationship values, wherein said displaying links a corresponding indicator to each of said other users.

16. The method according to claim 13, wherein said indicators comprise one or more of sizes, fonts, icons, graphic features, colors, motions, speeds, and directions.

17. The method according to claim 13, wherein said processing comprises automatically, and without user intervention, evaluating e-mail information to produce said relationship metrics.

18. The method according to claim 13, wherein said displaying further comprises limiting which of said other users are to be displayed based on at least one of a predetermined maximum number of said other users, a predetermined minimum relationship value for said other users, and additional logical groupings of said other users.

19. The method according to claim 13, wherein said other users comprise a subset of all users of said network.

20. A method of displaying strengths of social relationships between users of a computerized network, said method comprising a computer performing the steps of:
evaluating network information and network communications between a first user of said network and other users of said network to produce relationship metrics between said first user and each of said other users, wherein each relationship metric comprises a measured value for a interactions between said first user and each of said other users;
normalizing said relationship metrics from the perspective of said first user, wherein said normalizing converts each of said relationship metrics to be relative to all of said relationship metrics associated with said first user to produce relationship values representing relative strengths of social relationships between said first user and said other users, and wherein one relationship value is produced for each one of said other users with respect to said first user;
classifying said relationship values into different groups based on said relative strengths of said social relationships;
assigning a context command to at least one of said different groups;
placing each of said other users in one of said different groups according to said relationship values;
assigning different indicators to each of said different groups such that each of said other users in each of said different groups is associated with a corresponding indicator; and
displaying, for each of at least some of said other users, an identifier and said corresponding indicator, so as to graphically distinguish in which of said different groups each of said at least some of said other users was placed.

21. The method according to claim 20, wherein each relationship metric comprises a number of e-mails received by said first user from one of said other users.

22. The method according to claim 20, wherein said assigning of said different indicators comprises assigning one or more of sizes, fonts, icons, graphic features, colors, motions, speeds, and directions to graphically distinguish said different groups into which each of said other users was placed.

23. The method according to claim 20, wherein said evaluating comprises automatically, and without user intervention, evaluating one or more of calendar information, event information, to-do list information, journal information, and e-mail information to produce said relationship metrics.

24. The method according to claim 20, wherein said displaying further comprises limiting which of said other users are to be displayed based on at least one of a predetermined maximum number of said other users, a predetermined minimum relationship value for said other users, and additional logical groupings of said other users.

25. The method according to claim 20, wherein said other users comprise a subset of all users of said network.

26. A program storage device readable by machine tangibly embodying a program of instructions executable by said machine to perform a method of displaying strengths of social relationships between users of a computerized network, said method comprising:
evaluating network information and network communications between a first user of said network and other users of said network to produce relationship metrics between said first user and each of said other users, wherein each relationship metric comprises a measured value interactions between said first user and one of said other users;
normalizing said relationship metrics from the perspective of said first user, wherein said normalizing converts each of said relationship metrics to be relative to all of said relationship metrics associated with said first user to produce relationship values representing relative strengths of social relationships between said first user and said other users, and wherein one relationship value is produced for each one of said other users with respect to said first user;
classifying said relationship values into different groups based on said relative strengths of said social relationships;
placing each of said other users in one of said different groups according to said relationship values;
assigning different indicators to each of said different groups such that each of said other users in each of said different groups is associated with a corresponding indicator; and
displaying, for each of at least some of said other users, an identifier and said corresponding indicator, so as to graphically distinguish in which of said different groups each of said at least some of said other users was placed.

27. The program storage device according to claim 26, wherein each relationship metric comprises a number of e-mails received by said first user from one of said other users.

28. The program storage device according to claim 26, wherein said assigning of said different indicators comprises assigning one or more of sizes, fonts, icons, graphic features, colors, motions, speeds, and directions to graphically distinguish said different groups into which each of said other users was placed.

29. The program storage device according to claim 26, wherein said evaluating comprises automatically, and without user intervention, evaluating one or more calendar information, event information, to-do list information, journal information, and e-mail information to produce said relationship metrics.

30. The program storage device according to claim 26, wherein said displaying further comprises limiting which of said other users are to be displayed based on at least one of a predetermined maximum number of said other users, a predetermined minimum relationship value for said other users, and additional logical groupings of said other users.

31. The program storage device according to claim 26, wherein said other users comprise a subset of all users of said network.

* * * * *